US011782535B1

(12) United States Patent
Law et al.

(10) Patent No.: US 11,782,535 B1
(45) Date of Patent: Oct. 10, 2023

(54) ADAPTIVE CHANNEL SWITCHING MECHANISM

(71) Applicant: DELL PRODUCTS L.P., Round Rock, TX (US)

(72) Inventors: Boon Kiat Law, Bukit Batok (SG); Vui Khen Thien, Bukit Batok (SG)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/967,630

(22) Filed: Oct. 17, 2022

(51) Int. Cl.
*G06F 3/038* (2013.01)
*G06F 3/023* (2006.01)

(52) U.S. Cl.
CPC ............ *G06F 3/038* (2013.01); *G06F 3/0231* (2013.01)

(58) Field of Classification Search
CPC ............... G06F 3/038; G06F 3/0231
USPC .................................. 345/173, 174
See application file for complete search history.

(56) References Cited

U.S. PATENT DOCUMENTS

| 8,214,468 | B2 | 7/2012 | Law et al. | |
| 9,110,863 | B2 | 8/2015 | Law et al. | |
| 11,011,133 | B2 | 5/2021 | Young et al. | |
| 11,270,666 | B1 | 3/2022 | Thien et al. | |
| 2009/0125654 | A1* | 5/2009 | Lou ........................... | G06F 3/14 710/73 |
| 2013/0050084 | A1* | 2/2013 | Soffer ..................... | G06F 3/023 345/163 |
| 2022/0236939 | A1 | 7/2022 | Thien et al. | |

* cited by examiner

*Primary Examiner* — Calvin C Ma
(74) *Attorney, Agent, or Firm* — Larson Newman, LLP (57) ABSTRACT

A system determines if a keyboard, video, and mouse mode is activated, and if so then determines whether a human interface device command is to switch from a first host. In response to determining that the human interface device command is to switch from the first host, the system redirects the human interface device command to a display monitor and switches video and universal serial bus input from the first host to the second host.

20 Claims, 6 Drawing Sheets

ADAPTIVE CHANNEL SWITCHING MECHANISM

FIELD OF THE DISCLOSURE

The present disclosure generally relates to information handling systems, and more particularly relates to an adaptive channel switching mechanism.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs, and requirements can vary between different applications. Thus, information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination.

SUMMARY

A system determines if a keyboard, video, and mouse mode is activated, and if so then determines whether a human interface device command is to switch from a first host. In response to determining that the human interface device command is to switch from the first host, the system redirects the human interface device command to a display monitor and switches video and universal serial bus input from the first host to the second host.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings and is provided to assist in describing the teachings. This focus should not be interpreted as a limitation on the scope or applicability of the teachings.

Figure 1:
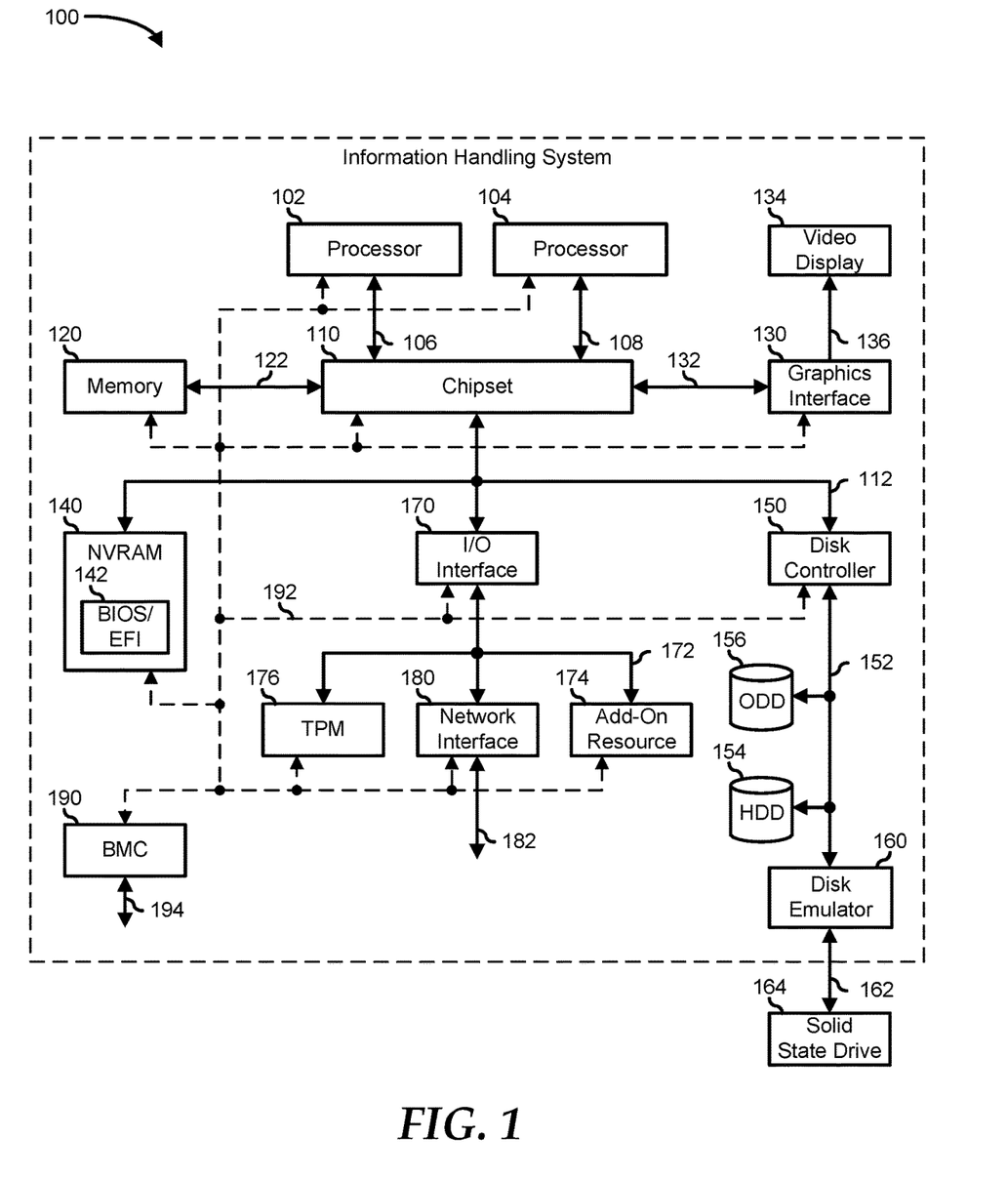
FIG. 1 is a block diagram illustrating an information handling system according to an embodiment of the present disclosure.

FIG. 1 illustrates an embodiment of an information handling system 100 including processors 102 and 104, a chipset 110, a memory 120, a graphics adapter 130 connected to a video display 134, a non-volatile RAM (NV-RAM) 140 that includes a basic input and output system/extensible firmware interface (BIOS/EFI) module 142, a disk controller 150, a hard disk drive (HDD) 154, an optical disk drive 156, a disk emulator 160 connected to a solid-state drive (SSD) 164, an input/output (I/O) interface 170 connected to an add-on resource 174 and a trusted platform module (TPM) 176, a network interface 180, and a baseboard management controller (BMC) 190. Processor 102 is connected to chipset 110 via processor interface 106, and processor 104 is connected to the chipset via processor interface 108. In a particular embodiment, processors 102 and 104 are connected together via a high-capacity coherent fabric, such as a HyperTransport link, a QuickPath Interconnect, or the like. Chipset 110 represents an integrated circuit or group of integrated circuits that manage the data flow between processors 102 and 104 and the other elements of information handling system 100. In a particular embodiment, chipset 110 represents a pair of integrated circuits, such as a northbridge component and a southbridge component. In another embodiment, some or all of the functions and features of chipset 110 are integrated with one or more of processors 102 and 104.

Memory 120 is connected to chipset 110 via a memory interface 122. An example of memory interface 122 includes a Double Data Rate (DDR) memory channel and memory 120 represents one or more DDR Dual In-Line Memory Modules (DIMMs). In a particular embodiment, memory interface 122 represents two or more DDR channels. In another embodiment, one or more of processors 102 and 104 include a memory interface that provides dedicated memory for the processors. A DDR channel and the connected DDR DIMMs can be in accordance with a particular DDR standard, such as a DDR3 standard, a DDR4 standard, a DDR5 standard, or the like.

Memory 120 may further represent various combinations of memory types, such as Dynamic Random Access Memory (DRAM) DIMMs, Static Random Access Memory (SRAM) DIMMs, non-volatile DIMMs (NV-DIMMs), storage class memory devices, Read-Only Memory (ROM)

devices, or the like. Graphics adapter 130 is connected to chipset 110 via a graphics interface 132 and provides a video display output 136 to a video display 134. An example of a graphics interface 132 includes a Peripheral Component Interconnect-Express (PCIe) interface and graphics adapter 130 can include a four-lane (×4) PCIe adapter, an eight-lane (×8) PCIe adapter, a 16-lane (×16) PCIe adapter, or another configuration, as needed or desired. In a particular embodiment, graphics adapter 130 is provided down on a system printed circuit board (PCB). Video display output 136 can include a Digital Video Interface (DVI), a High-Definition Multimedia Interface (HDMI), a DisplayPort interface, or the like, and video display 134 can include a monitor, a smart television, an embedded display such as a laptop computer display, or the like.

NV-RAM 140, disk controller 150, and I/O interface 170 are connected to chipset 110 via an I/O channel 112. An example of I/O channel 112 includes one or more point-to-point PCIe links between chipset 110 and each of NV-RAM 140, disk controller 150, and I/O interface 170. Chipset 110 can also include one or more other I/O interfaces, including a PCIe interface, an Industry Standard Architecture (ISA) interface, a Small Computer Serial Interface (SCSI) interface, an Inter-Integrated Circuit ($I^2C$) interface, a System Packet Interface (SPI), a Universal Serial Bus (USB), another interface, or a combination thereof. NV-RAM 140 includes BIOS/EFI module 142 that stores machine-executable code (BIOS/EFI code) that operates to detect the resources of information handling system 100, to provide drivers for the resources, to initialize the resources, and to provide common access mechanisms for the resources. The functions and features of BIOS/EFI module 142 will be further described below.

Disk controller 150 includes a disk interface 152 that connects the disc controller to a hard disk drive (HDD) 154, to an optical disk drive (ODD) 156, and to disk emulator 160. An example of disk interface 152 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 160 permits SSD 164 to be connected to information handling system 100 via an external interface 162. An example of external interface 162 includes a USB interface, an institute of electrical and electronics engineers (IEEE) 1394 (Firewire) interface, a proprietary interface, or a combination thereof. Alternatively, SSD 164 can be disposed within information handling system 100.

I/O interface 170 includes a peripheral interface 172 that connects the I/O interface to add-on resource 174, to TPM 176, and to network interface 180. Peripheral interface 172 can be the same type of interface as I/O channel 112 or can be a different type of interface. As such, I/O interface 170 extends the capacity of I/O channel 112 when peripheral interface 172 and the I/O channel are of the same type, and the I/O interface translates information from a format suitable to the I/O channel to a format suitable to the peripheral interface 172 when they are of a different type. Add-on resource 174 can include a data storage system, an additional graphics interface, a network interface card (NIC), a sound/video processing card, another add-on resource, or a combination thereof. Add-on resource 174 can be on a main circuit board, on separate circuit board or add-in card disposed within information handling system 100, a device that is external to the information handling system, or a combination thereof.

Network interface 180 represents a network communication device disposed within information handling system 100, on a main circuit board of the information handling system, integrated onto another component such as chipset 110, in another suitable location, or a combination thereof. Network interface 180 includes a network channel 182 that provides an interface to devices that are external to information handling system 100. In a particular embodiment, network channel 182 is of a different type than peripheral interface 172, and network interface 180 translates information from a format suitable to the peripheral channel to a format suitable to external devices.

In a particular embodiment, network interface 180 includes a NIC or host bus adapter (HBA), and an example of network channel 182 includes an InfiniBand channel, a Fibre Channel, a Gigabit Ethernet channel, a proprietary channel architecture, or a combination thereof. In another embodiment, network interface 180 includes a wireless communication interface, and network channel 182 includes a Wi-Fi channel, a near-field communication (NFC) channel, a Bluetooth® or Bluetooth-Low-Energy (BLE) channel, a cellular based interface such as a Global System for Mobile (GSM) interface, a Code-Division Multiple Access (CDMA) interface, a Universal Mobile Telecommunications System (UMTS) interface, a Long-Term Evolution (LTE) interface, or another cellular based interface, or a combination thereof. Network channel 182 can be connected to an external network resource (not illustrated). The network resource can include another information handling system, a data storage system, another network, a grid management system, another suitable resource, or a combination thereof.

BMC 190 is connected to multiple elements of information handling system 100 via one or more management interface 192 to provide out of band monitoring, maintenance, and control of the elements of the information handling system. As such, BMC 190 represents a processing device different from processor 102 and processor 104, which provides various management functions for information handling system 100. For example, BMC 190 may be responsible for power management, cooling management, and the like. The term BMC is often used in the context of server systems, while in a consumer-level device a BMC may be referred to as an embedded controller (EC). A BMC included at a data storage system can be referred to as a storage enclosure processor. A BMC included in a chassis of a blade server can be referred to as a chassis management controller and embedded controllers included in the blades of the blade server can be referred to as blade management controllers. Capabilities and functions provided by BMC 190 can vary considerably based on the type of information handling system. BMC 190 can operate in accordance with an Intelligent Platform Management Interface (IPMI). Examples of BMC 190 include an Integrated Dell® Remote Access Controller (iDRAC).

Management interface 192 represents one or more out-of-band communication interfaces between BMC 190 and the elements of information handling system 100, and can include an Inter-Integrated Circuit ($I^2C$) bus, a System Management Bus (SMBUS), a Power Management Bus (PMBUS), a Low Pin Count (LPC) interface, a serial bus such as a USB or a Serial Peripheral Interface (SPI), a network interface such as an Ethernet interface, a high-speed serial data link such as a PCIe interface, a Network Controller Sideband Interface (NC-SI), or the like. As used herein, out-of-band access refers to operations performed apart from a BIOS/operating system execution environment on information handling system 100, that is apart from the execution of code by processors 102 and 104 and procedures that are implemented on the information handling system in response to the executed code.

BMC 190 operates to monitor and maintain system firmware, such as code stored in BIOS/EFI module 142, option ROMs for graphics adapter 130, disk controller 150, add-on resource 174, network interface 180, or other elements of information handling system 100, as needed or desired. In particular, BMC 190 includes a network interface 194 that can be connected to a remote management system to receive firmware updates, as needed or desired. Here, BMC 190 receives the firmware updates, stores the updates to a data storage device associated with the BMC, transfers the firmware updates to NV-RAM of the device or system that is the subject of the firmware update, thereby replacing the currently operating firmware associated with the device or system, and reboots information handling system, whereupon the device or system utilizes the updated firmware image.

BMC 190 utilizes various protocols and application programming interfaces (APIs) to direct and control the processes for monitoring and maintaining the system firmware. An example of a protocol or API for monitoring and maintaining the system firmware includes a graphical user interface (GUI) associated with BMC 190, an interface defined by the Distributed Management Taskforce (DMTF) (such as a Web Services Management (WSMan) interface, a Management Component Transport Protocol (MCTP) or, a Redfish® interface), various vendor defined interfaces (such as a Dell EMC Remote Access Controller Administrator (RACADM) utility, a Dell EMC OpenManage Enterprise, a Dell EMC OpenManage Server Administrator (OMSS) utility, a Dell EMC OpenManage Storage Services (OMSS) utility, or a Dell EMC OpenManage Deployment Toolkit (DTK) suite), a BIOS setup utility such as invoked by a "F2" boot option, or another protocol or API, as needed or desired.

In a particular embodiment, BMC 190 is included on a main circuit board (such as a baseboard, a motherboard, or any combination thereof) of information handling system 100 or is integrated onto another element of the information handling system such as chipset 110, or another suitable element, as needed or desired. As such, BMC 190 can be part of an integrated circuit or a chipset within information handling system 100. An example of BMC 190 includes an iDRAC, or the like. BMC 190 may operate on a separate power plane from other resources in information handling system 100. Thus BMC 190 can communicate with the management system via network interface 194 while the resources of information handling system 100 are powered off. Here, information can be sent from the management system to BMC 190 and the information can be stored in a RAM or NV-RAM associated with the BMC. Information stored in the RAM may be lost after the power-down of the power plane for BMC 190, while information stored in the NV-RAM may be saved through a power-down/power-up cycle of the power plane for the BMC.

Information handling system 100 can include additional components and additional busses, not shown for clarity. For example, information handling system 100 can include multiple processor cores, audio devices, and the like. While a particular arrangement of bus technologies and interconnections is illustrated for the purpose of example, one of skill will appreciate that the techniques disclosed herein are applicable to other system architectures. Information handling system 100 can include multiple central processing units (CPUs) and redundant bus controllers. One or more components can be integrated together. Information handling system 100 can include additional buses and bus protocols, for example, $I^2C$ and the like. Additional components of information handling system 100 can include one or more storage devices that can store machine-executable code, one or more communications ports for communicating with external devices, and various input and output (I/O) devices, such as a keyboard, a mouse, and a video display.

For purposes of this disclosure, information handling system 100 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 100 can be a personal computer, a laptop computer, a smartphone, a tablet device or other consumer electronic device, a network server, a network storage device, a switch, a router, or another network communication device, or any other suitable device and may vary in size, shape, performance, functionality, and price. Further, information handling system 100 can include processing resources for executing machine-executable code, such as processor 102, a programmable logic array (PLA), an embedded device such as a System-on-a-Chip (SoC), or other control logic hardware. Information handling system 100 can also include one or more computer-readable media for storing machine-executable code, such as software or data.

The inventors have recognized that users with multiple computers may use a multi-device wireless keyboard to switch between computers. Such computers are generally wirelessly coupled to the keyboard, such as via Bluetooth®. The user may manipulate the keyboard such as by pressing a connector button on the keyboard to switch from one computer to the other computer. However users may find it more convenient to dock a portable computer to a full-size keyboard and display monitor and access multiple computers via a keyboard, video, and mouse (KVM) switch. In this scenario, the computers may be wired to the KVM switch and the keyboard may be wired or wirelessly coupled to the KVM switch. Although typically the KVM switch may be a distinct device, some display monitors have an integrated KVM feature, wherein the computers are wired to the USB hub of the display monitor. Because the computers are wired, pressing the control button on the keyboard would not cause the switch from one computer to the other.

Typically when using the KVM feature of the display monitor, the user can switch between multiple computers by configuring an on-display menu. Alternatively, the user may install a software application on each of the computers and configure a shortcut that acts as a proxy to interact with the computer. Also, the user may have to reach out to use a physical control button on the KVM switch or display monitor to switch between the computers, which requires a bit more effort than when the control button is located on the keyboard. In addition, these different mechanisms may be a bit cumbersome or clunky for users, as there is no coherent way to switch between computers. For example, the user may have the KVM switch or the display monitor with the KVM feature at work but may not have those aforementioned devices at home. Accordingly, the user may have to remember which mechanism to use at home versus at work which may be confusing, frustrating, or unproductive.

To make switching between computers more efficient, seamless, and user-friendly, the present disclosure provides a dynamic mechanism that allows a user with a display monitor that has an integrated KWM feature to switch between computers by using the control button on his keyboard. This way switching computers, whether the computers are wired to the USB of a display monitor or wirelessly connected to the keyboard, is the same mechanism. In particular, the KVM feature of the display monitor is adapted with an automated self-configuration feature to allow the user to leverage the keyboard or other multi-device human interface device like a mouse without additional on-screen display manipulation, software installations, and/ or pressing a physical button on the display monitor. As such, the user may use the keyboard like the keyboard is not associated with the display monitor with the integrated KVM feature. For example, the user can press the button in a human interface device, like the keyboard, to switch between computers as he/she typically does whether it is associated with the display monitor or not.

Figure 2:
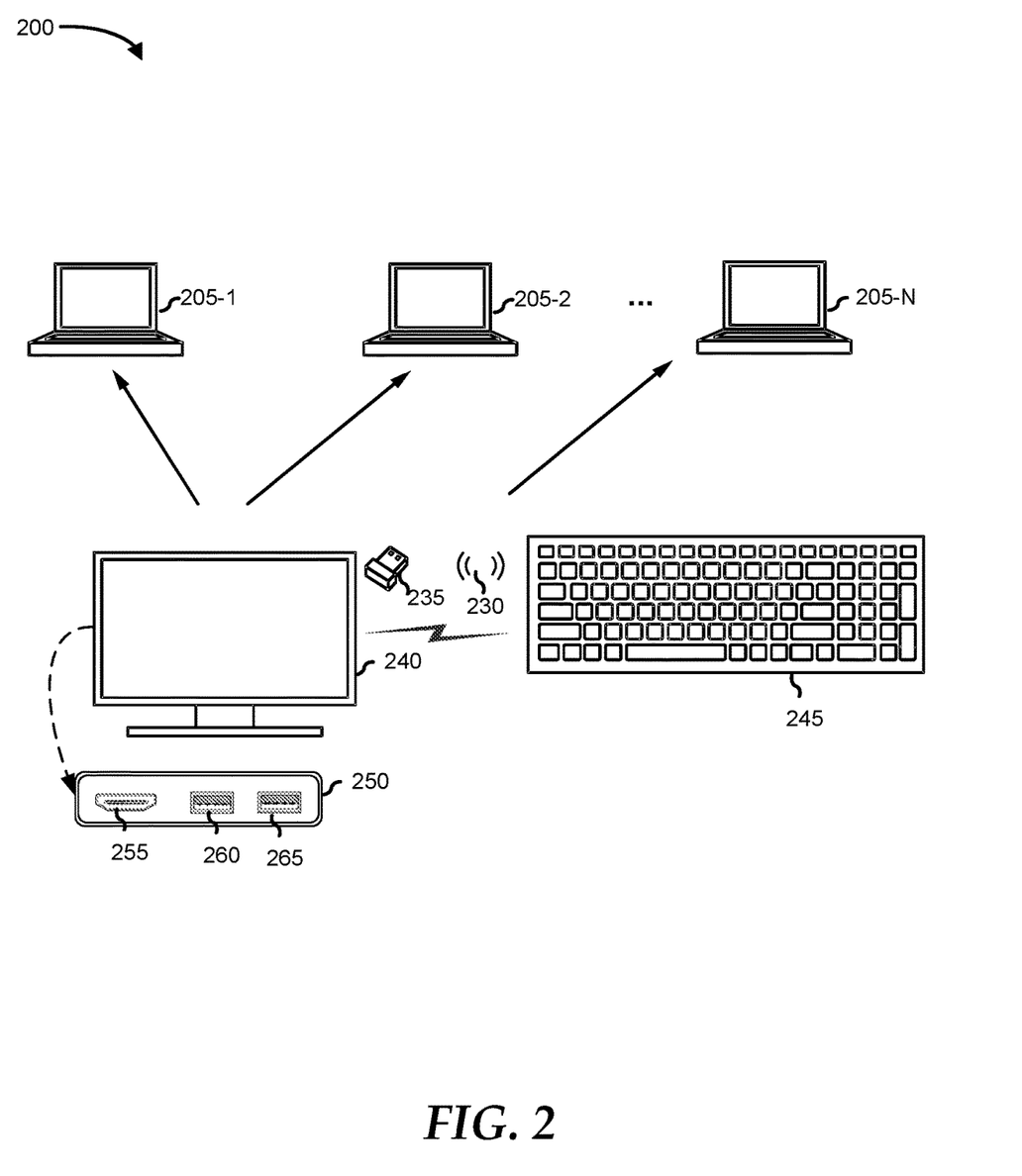
FIG. 2 is a block diagram illustrating a system with an adaptive channel switching mechanism, according to an embodiment of the present disclosure.

FIG. 2 shows a system 200 with an adaptive channel switching mechanism. System 200 includes a display monitor 240, host 205-1 through host 205-n (also referred to herein as hosts 205 or host 205), and a human interface device, such as a keyboard 245. Display monitor 240 includes a display monitor hub 250 for connecting host systems and/or peripheral devices. For example, display monitor hub 250 may include one or more interfaces video or USB ports which may be used in connecting the hosts 205, keyboard 245, and/or other peripheral devices. For example, a dongle 235 may be plugged into USB port 265 of display monitor hub 250 to provide wireless communication between keyboard 245 and display monitor 240. In addition, display monitor hub 250 may include an HDMI port 255 and a USB Type-C (USB-C) port 260.

Each of hosts 205 may be an information handling system similar to information handling system 100 of FIG. 1. For example, host 205 may be one of a computing device, desktop computer, notepad computer, smartphone, laptop computer, server, notebook computer, or any suitable information handling system. In addition, hosts 205 may each have different operating system platforms. Although, hosts 205 are shown to be portable devices, one or more of hosts 205 can be a non-portable device such as a desktop computer.

Keyboard 245 is a multi-device human interface device that can wirelessly interact with display monitor 240. For example, keyboard 245 may communicate with display monitor 240 via dongle 235 which may be a radio frequency-enabled device, an infrared technology-enabled device, a Bluetooth® enabled device, or similar. Although a keyboard is used in this example, other multi-device human interface devices may be used, such as a mouse, headphone, headset, game pad, printer, graphics tablet, image scanner, barcode reader, loudspeaker, etc. without affecting the features disclosed herein.

Display monitor 240 includes an integrated KVM feature that allows a user to switch between a set of hosts that are connected to display monitor hub 250, such as between hosts 205. Display monitor 240 may also include an MCU that includes firmware configured to automatically detect whether the KVM mode is activated or not similar to dongle 235. Here, each of hosts 205 may be connected to display monitor hub 250 of display monitor 240 via a wire or cable. While keyboard 245 may use plugged-in dongle 235. With the present disclosure, keyboard 245 may be configured such that it is capable to activate and operate under a KVM mode. In particular, keyboard 245 may detect whether it is communicatively coupled to a display monitor with an integrated KVM feature with multiple hosts connected thereto, such as display monitor 240.

When the KVM mode is activated and a user manipulation is detected, such as a user pressing the control button on keyboard 245, the integrated KVM feature will switch between computers of a set of host computers. In particular, keyboard 245 will remain in a wireless channel 230 it uses for communication with display monitor 240. The integrated KVM feature of display monitor 240 switches from a first host to a second host. The integrated KVM feature may be able to process a human interface device command from keyboard 245 to determine whether the user is manipulating the control button on keyboard 245 to switch hosts or otherwise.

Display monitor hub 250, which may be a USB hub or similar, is configured to automatically detect the KVM monitor environment. For example, display monitor hub 250 may also be able to determine if there are multiple hosts connected to it. In addition, display monitor hub 250, also includes a host bridge that may automatically detect when a wireless dongle associated with a human interface device, such as keyboard 245 is plugged into the embedded KVM switch, whether keyboard 245 is a multi-device keyboard, and whether the KVM mode is activated. If the KVM mode is activated, then when a user manipulation at keyboard 245 is detected by the host bridge, keyboard 245 may remain at its current wireless channel and the human interface device command may be redirected to display monitor MCU by the host bridge. To do so, the host bridge may determine whether the human interface device command it received from keyboard 245 is a "KVM command" (to switch hosts) versus non-KVM commands. The human interface device command can be filtered based on a pre-defined header. For KVM commands, the host bridge may redirect the human interface device command or a portion thereof to the display monitor MCU which changes the video and USB inputs. The non-KVM commands are transmitted to the connected host to be processed accordingly.

Figure 3:
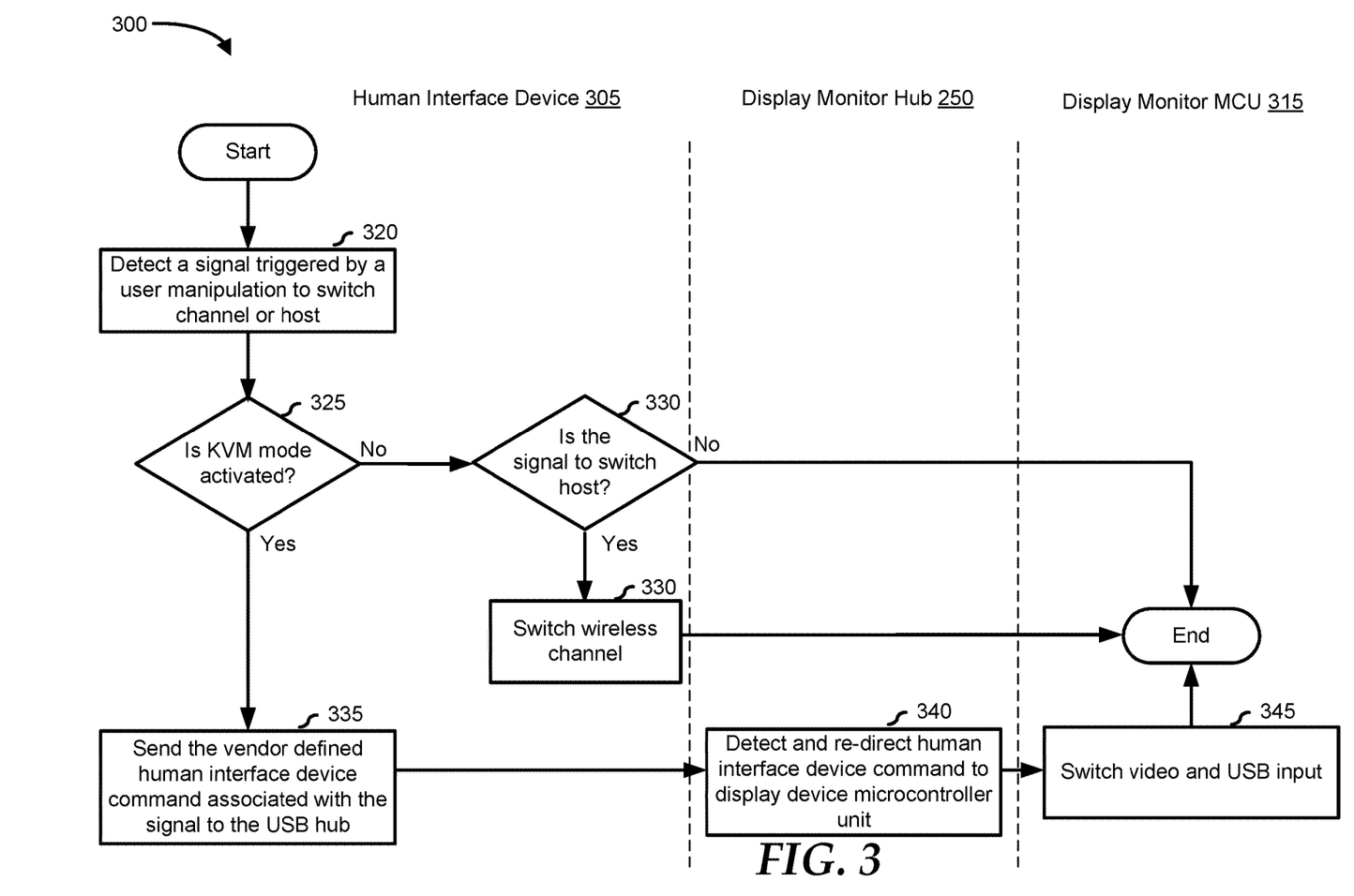
FIG. 3 is a flowchart illustrating a method for adaptive channel switching, according to an embodiment of the present disclosure.

FIG. 3 shows a flowchart of method 300 for an adaptive wireless channel mechanism. Method 300 may be performed by a human interface device 305, display monitor hub 250, and a display monitor microcontroller unit (MCU) 315. Human interface device 305 may be similar to keyboard 245 of FIG. 1 or similar. For example, human interface device 305 may be a mouse. Method 300 typically starts at block 320 where human interface device 305 detects a signal that is triggered by user manipulation of the human interface device. For example, the user may press a control button, an alphabet key, or the like. Prior to block 320, human interface device 305 may have been paired to a display monitor, such as via an RF dongle. Human interface device 305 may also have been paired to one or more host computers.

The method proceeds to decision block 325, where the method determines whether the KVM mode on human interface device 305 is activated. If the KVM mode is activated, then the "YES" branch is taken, and the method proceeds to block 335. If the KVM mode is not activated, then the "NO" branch is taken, and the method proceeds to decision block 330. At decision block 330, the method determines whether the signal is to switch host. If the signal is to switch the host, then the "YES" branch is taken, and the method proceeds to block 330 where the method switches the wireless channel or host. For example, if human interface device 305 is wirelessly connected to a first host, then human interface device 305 disconnects from the first host and connects to a second host. At block 335, the method sends a vendor-defined human interface device command to display monitor hub 250. At block 340, display monitor hub 250 receives the HID command and re-directs it to display monitor MCU 315. At block 345, the display monitor MCU switches video and USB input from the first host to the second host.

Figure 4:
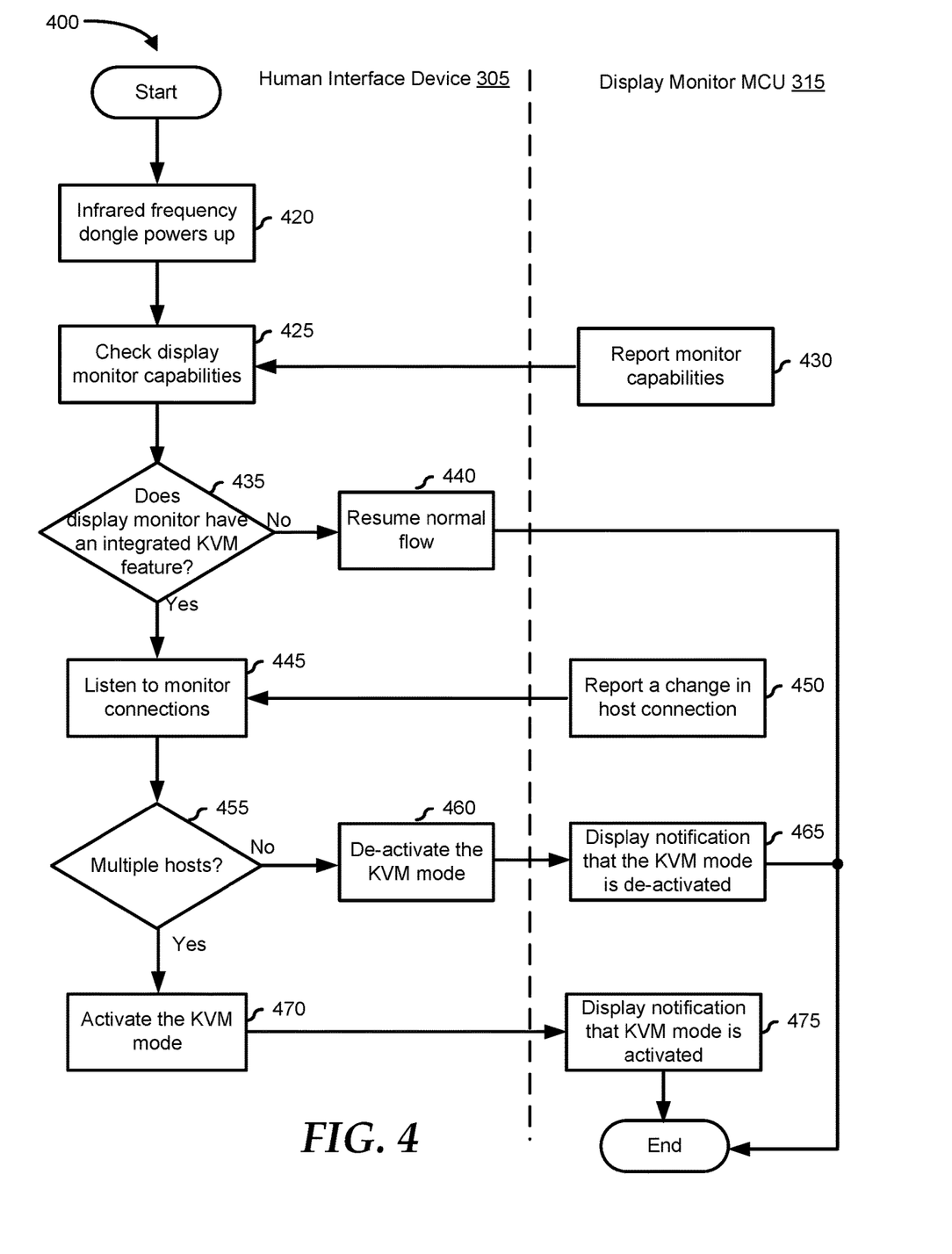
FIG. 4 is a flowchart illustrating of a method for enabling keyboard, video, and mouse mode, according to an embodiment of the present disclosure.

FIG. 4 shows a flowchart of a method 400 for an adaptive wireless channel mechanism. Method 400 may be performed by human interface device 305 and a display monitor MCU 315. Method 400 typically starts at block 420 wherein an RF dongle associated with human interface device 305 powers up upon being plugged into one of the ports of the display monitor hub. At block 425, human interface device 305 checks the display monitor capabilities reported by display monitor MCU 315 at block 430. The monitor capabilities may include information on whether the display monitor includes an integrated KVM feature. The report may also provide the current connection status and changes to the connection status of the RF dongle. At decision block 435, the method determines whether the display monitor includes an integrated KVM feature activated. If the display monitor includes an integrated KVM feature, then the "YES" branch is taken, and the method proceeds to block 445. If the display monitor does not have an integrated KVM feature, then the "NO" branch is taken, and the method proceeds to block 440 where human interface device 305 returns to its normal flow.

At block 445, human interface device 305 may listen to monitor connections, such as a report of a change in host connection from display monitor MCU 315 at block 450. The method may report connection changes to the RF dongle. At decision block 455, the method determines whether there are multiple hosts associated with the display monitor. If there are multiple hosts, then the "YES" branch is taken, and the method proceeds to block 470 where the KVM mode is activated. If there is only one host, then the "NO" branch is taken, and the method proceeds to block 460 where the KVM mode is de-activated. At block 465, display monitor MCU 315 may display a notification that the KVM mode is de-activated. At block 475, display monitor MCU 315 may display a notification that the KVM mode is activated. The notification may include an option for the user to deactivate the KVM mode.

Figure 5:
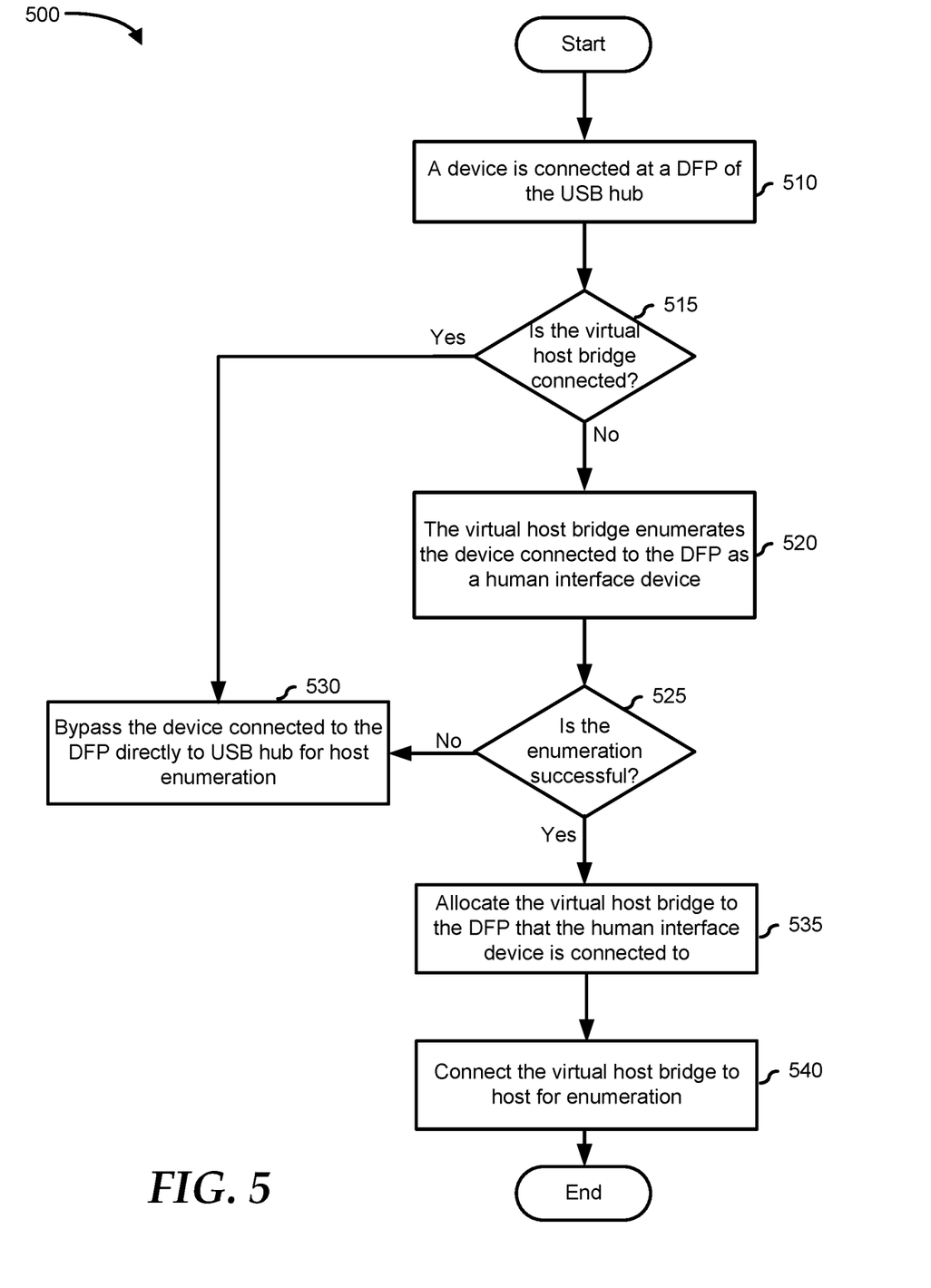
FIG. 5 is a flowchart illustrating a method for a human interface device host enumeration, according to an embodiment of the present disclosure.

FIG. 5 shows a flowchart of a method 500 for an adaptive wireless channel mechanism. Method 500 typically starts at block 510 where a new device connects to a downstream facing port (DFP) of the USB hub integrated with the display monitor. The method proceeds to decision block 515 where the method determines whether a virtual host bridge is connected. If the virtual host bridge is connected, then the "YES" branch is taken, and the method proceeds to block 530. If the virtual host bridge is not connected, then the "NO" branch is taken, and the method proceeds to block 520.

At block 520, the method may enumerate the device connected at the DFP as a human interface device. The method proceeds to decision block 525, wherein the method determines whether the enumeration is successful. If the enumeration is successful, then the "YES" branch is taken, and the method proceeds to block 535. If the enumeration is not successful, then the "NO" branch is taken, and the method proceeds to block 530. At block 530, the method may bypass the device connected to the DFP directly to the display monitor hub for host enumeration. At block 535, the method allocates the virtual host bridge to the DFP that the human interface device is connected to. The method proceeds to block 540 where the method connects the virtual host bridge to the host for enumeration.

Figure 6:
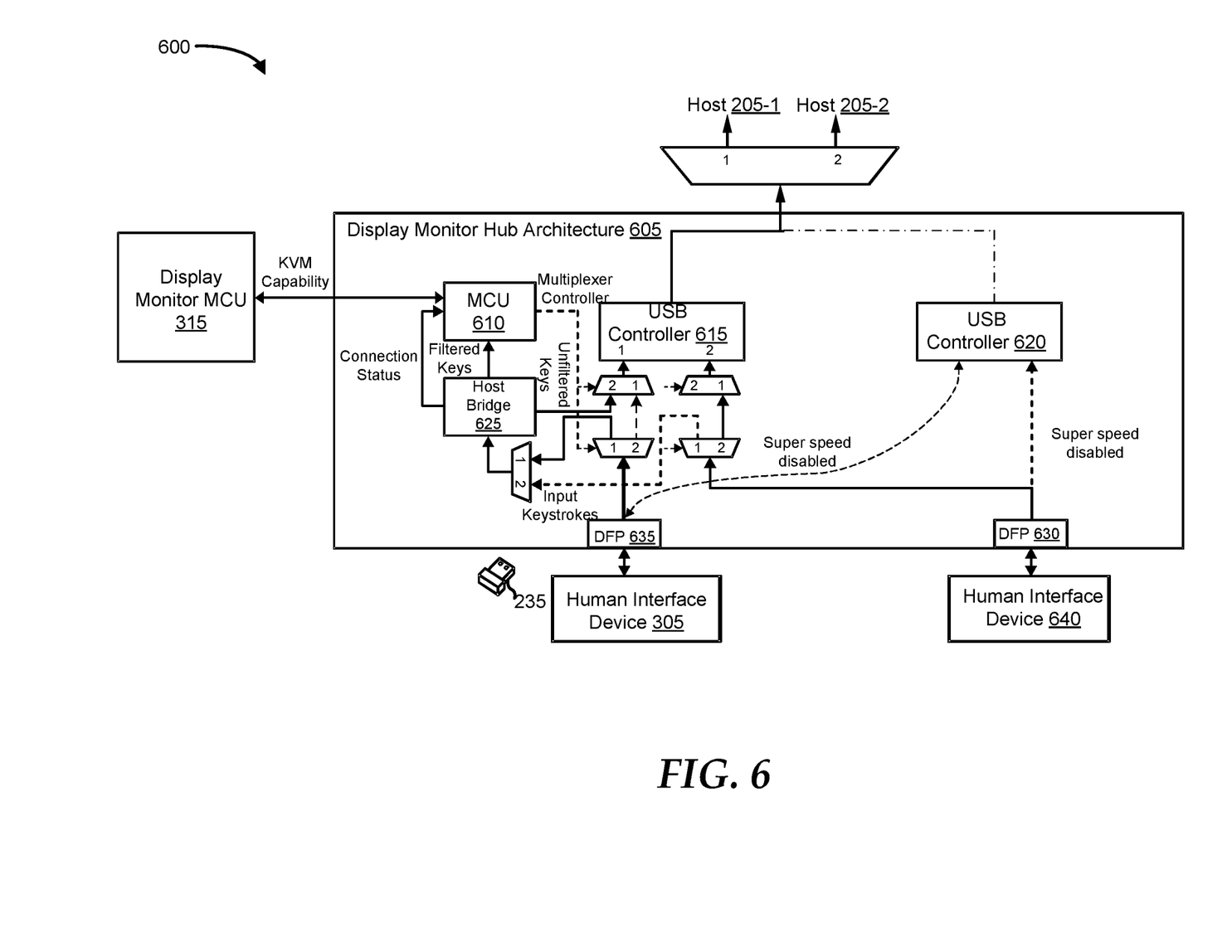
FIG. 6 is a block diagram illustrating an adaptive channel switching mechanism, according to an embodiment of the present disclosure.

FIG. 6 shows a system 600 for redirecting a human interface device command received at the display monitor hub from the human interface device. System 600 includes display monitor MCU 315 and human interface devices 305 and 640. In this example, human interface device 305 is connected to DFP 635 via dongle 235 while human interface device 640 is connected to DFP 630. Human interface device 305 may be a multi-device keyboard similar to keyboard 245 of FIG. 2. Also depicted in system 600 is display monitor hub architecture 605 of display monitor hub 250. Display monitor hub architecture 605 includes MCU 610, a host bridge 625, a USB controller 615, a USB controller 620, a DFP 635, and a DFP 630. USB controller 615 may support USB 2.0 while USB controller 620 may support USB 3.2 super speed.

Host bridge 625 may be configured to report a connection status of a human interface device connected to a downstream facing port (DFP), such as DFP 635 and DFP 630. Further, when a human interface device command is received from human interface device 305 at DFP 635, the human interface device command may be filtered by host bridge 625 based on pre-defined headings. If the human interface device command is to switch input from a first host to a second host, such as from host 205-1 to host 205-2 then host bridge 625 may send the human interface device command to MCU 610 which then sends it to display monitor MCU 315 via I²C or universal asynchronous receiver transmitter protocol. For example, the human interface device command may include the header to switch hosts when the user presses the connection switch button on the human interface device 305. Otherwise, the human interface device command may be sent to the first host via USB controller 615.

The components of system 200 and system 600 may be implemented in hardware, software, firmware, or any combination thereof. In various embodiments, system 200 and system 600 may not include each of the components shown in FIG. 2 and FIG. 6 respectively. Additionally, or alternatively, system 200 and system 600 may include various additional components in addition to those that are shown in FIG. 2 and FIG. 6. Furthermore, some components that are represented as separate components in FIG. 2 and FIG. 6 may in certain embodiments instead are integrated with other components. For example, in certain embodiments, all or a portion of the functionality provided by the illustrated components may instead be provided by components integrated into one or more processor(s) as a system-on-a-chip.

While embodiments of the above methods are described in terms of system 200 of FIG. 2, it should be recognized that other systems may be utilized to perform the described method. One of skill in the art will appreciate that the flowcharts depicted above explain a typical example, which can be extended to advanced applications or services in practice. In addition, although FIG. 3, FIG. 4, and FIG. 5 show example blocks of method 300, method 400, and method 500 in some implementations, method 300, method 400, and method 500 may include additional blocks, fewer blocks, different blocks, or differently arranged blocks than those depicted in FIG. 3, FIG. 4, and FIG. 5. Those skilled in the art will understand that the principles presented herein may be implemented in any suitably arranged processing system. Additionally, or alternatively, two or more of the blocks of method 300, method 400, and method 500 may be performed in parallel.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionalities as described herein.

When referred to as a "device," a "module," a "unit," a "controller," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded in a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device).

The present disclosure contemplates a computer-readable medium that includes instructions or receives and executes instructions responsive to a propagated signal; so that a device connected to a network can communicate voice, video, or data over the network. Further, the instructions may be transmitted or received over the network via the network interface device.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tape, or another storage device to store information received via carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents but also equivalent structures.

What is claimed is:

1. A method comprising:
   allocating, by a processor, a host bridge to a downstream facing port;
   receiving a human interface device command to switch from a first host to a second host;
   determining whether a keyboard, video, and mouse (KVM) mode is activated;
   in response to determining that the KVM mode is activated, determining whether the human interface device command is to switch from the first host; and
   in response to determining that the human interface device command is to switch from the first host, redirecting the human interface device command to a microcontroller unit of a display monitor and switching video and universal serial bus input, by the microcontroller unit of the display monitor, from the first host to the second host.

2. The method of claim 1, wherein the human interface device command is received from a human interface device.

3. The method of claim 1, further comprising filtering the human interface device command based on a pre-defined header.

4. The method of claim 1, further comprising determining whether there are multiple hosts connected to the display monitor.

5. The method of claim 1, further comprising determining whether the display monitor includes an integrated KVM feature.

6. The method of claim 1, wherein the human interface device command is redirected via an inter-integrated circuit interface.

7. The method of claim 1, further comprising sending the human interface device command to the second host.

8. An information handling system, comprising:
   a processor; and
   a memory device storing code, the code when executed causing the processor to perform operations including:
      determining whether a host bridge is connected to a downstream facing port;
      receiving a human interface device command to switch from a first host to a second host from a human interface device that is connected to the downstream facing port;
      if a keyboard, video, and mouse (KVM) mode is activated, then determining whether the human interface device command is to switch from the first host; and
      in response to determining that the human interface device command is to switch from the first host, redirecting the human interface device command to a microcontroller unit of a display monitor and switching video and universal serial bus input, by the microcontroller unit of the display monitor, from the first host to the second host.

9. The information handling system of claim 8, the operations further comprising filtering the human interface device command based on a pre-defined header.

10. The information handling system of claim 8, the operations further comprising determining whether the display monitor includes an integrated KVM feature.

11. The information handling system of claim 8, the operations further comprising determining whether there is more than one host computer connected to the display monitor.

12. The information handling system of claim 8, the operations further comprising activating the KVM mode.

13. The information handling system of claim 8, the operations further comprising allocating the host bridge to the downstream facing port.

14. A non-transitory computer-readable medium to store instructions that are executable to perform operations comprising:

in response to detecting a signal triggered by a user manipulation of a keyboard, video, and mouse (KVM) mode, determining whether the KVM mode is activated;

if KVM mode is activated, then determining whether a human interface device command is to switch from a first host to a second host; and if the human interface device command is to switch from the first host to the second host, then redirecting the human interface device command to a microcontroller unit of a display monitor and switching video and universal serial bus input, by the microcontroller unit of the display monitor, from the first host to the second host.

15. The non-transitory computer-readable medium of claim 14, the operations further comprising filtering the human interface device command based on a pre-defined header.

16. The non-transitory computer-readable medium of claim 14, the operations further comprising determining whether the display monitor includes an integrated KVM feature.

17. The non-transitory computer-readable medium of claim 14, the operations further comprising determining whether there is more than one host computer connected to the display monitor.

18. The non-transitory computer-readable medium of claim 14, the operations further comprising activating the KVM mode.

19. The non-transitory computer-readable medium of claim 14, wherein the human interface device command is redirected via an inter-integrated circuit interface.

20. The non-transitory computer-readable medium of claim 14, the operations further comprising allocating a host bridge to a downstream facing port.

\* \* \* \* \*